(12) United States Patent
Weichholdt

(10) Patent No.: US 10,201,128 B2
(45) Date of Patent: Feb. 12, 2019

(54) STRAW CHOPPER FOR A COMBINE HARVESTER HAVING COUNTER-BLADES AND A STRAW DAM

(71) Applicant: Deere & Company, Moline, IL (US)

(72) Inventor: Dirk Weichholdt, Woelfling les Sarreguemin (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/212,431

(22) Filed: Jul. 18, 2016

(65) Prior Publication Data
US 2017/0086379 A1    Mar. 30, 2017

(30) Foreign Application Priority Data
Sep. 29, 2015 (DE) .................. 10 2015 218 726

(51) Int. Cl.
| | | |
|---|---|---|
| A01F 12/40 | (2006.01) | |
| A01F 12/39 | (2006.01) | |
| A01D 41/00 | (2006.01) | |

(52) U.S. Cl.
CPC ............. *A01F 12/39* (2013.01); *A01D 41/00* (2013.01)

(58) Field of Classification Search
CPC .... A01F 12/40; A01F 29/04; A01F 2015/107; A01F 2015/108; A01F 29/00; A01F 29/12; A01D 41/1243
See application file for complete search history.

(56) References Cited

U.S. PATENT DOCUMENTS

| | | | | |
|---|---|---|---|---|
| 2,626,159 A | * | 1/1953 | Thompson | A01F 12/40 239/689 |
| 4,612,941 A | | 9/1986 | Kunde | |
| 5,503,339 A | * | 4/1996 | Doppstadt | B02C 13/04 241/166 |
| 5,542,883 A | * | 8/1996 | Cruson | A01D 41/1243 460/112 |
| 5,556,042 A | * | 9/1996 | Roberg | A01D 41/1243 241/101.76 |
| 5,769,711 A | * | 6/1998 | Roberg | A01F 12/40 460/112 |
| 5,833,533 A | * | 11/1998 | Roberg | A01F 12/40 460/112 |
| 5,913,724 A | * | 6/1999 | Roberg | A01F 12/40 460/112 |
| 5,928,080 A | * | 7/1999 | Jakobi | A01F 12/40 460/112 |
| 5,974,776 A | * | 11/1999 | Prellwitz | A01D 90/04 460/112 |

(Continued)

FOREIGN PATENT DOCUMENTS

EP    0415419 A2    3/1991

OTHER PUBLICATIONS

German Search Report in foreign counterpart application No. 16184265.3 dated Mar. 1, 2017 (5 pages).

*Primary Examiner* — Arpad Fabian-Kovacs
(74) *Attorney, Agent, or Firm* — Rathe Lindenbaum LLP

(57) ABSTRACT

A straw chopper (42) for a combine harvester (10) is provided with a housing (54-60) that has an inlet (72) and an outlet (74), a rotor (46) with suspended chopping blades (48) that is arranged in the housing (54-60), adjustably arranged counter-blades (62) and a straw dam (64). The adjustments of the straw dam (64) and of the counter-blades (62) are coupled to one another.

20 Claims, 3 Drawing Sheets

(56) References Cited

U.S. PATENT DOCUMENTS

| | | | | |
|---|---|---|---|---|
| 6,354,938 | B1* | 3/2002 | Schrattenecker | A01F 12/40 241/47 |
| 7,387,065 | B2* | 6/2008 | Altenbuchner | A01F 25/14 100/100 |
| 7,510,472 | B1* | 3/2009 | Farley | A01D 90/04 460/112 |
| 7,862,413 | B2* | 1/2011 | Isaac | A01F 12/40 460/112 |
| 2005/0282602 | A1* | 12/2005 | Redekop | A01D 41/1243 460/112 |
| 2008/0293462 | A1* | 11/2008 | Farley | A01F 12/40 460/112 |
| 2010/0291982 | A1 | 11/2010 | Isaac et al. | |
| 2014/0326815 | A1* | 11/2014 | Dilts | A01F 12/40 241/54 |
| 2015/0038201 | A1* | 2/2015 | Brinkmann | A01F 29/00 460/112 |
| 2016/0007537 | A1* | 1/2016 | Dilts | A01F 12/40 460/112 |
| 2016/0044869 | A1* | 2/2016 | Mayerle | A01F 12/40 460/1 |
| 2017/0055445 | A1* | 3/2017 | Mahieu | A01F 12/40 |
| 2017/0099771 | A1* | 4/2017 | Linde | A01D 41/1243 |

\* cited by examiner

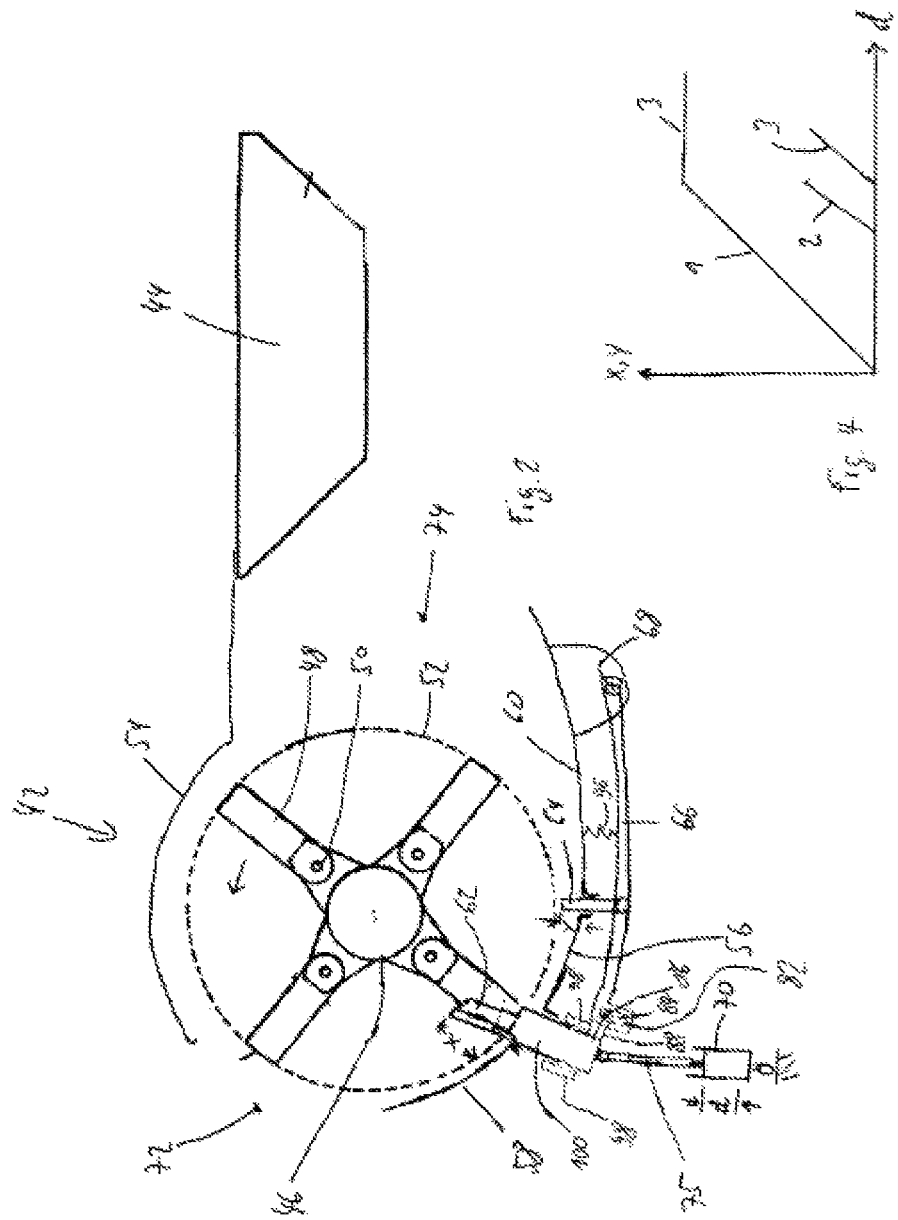

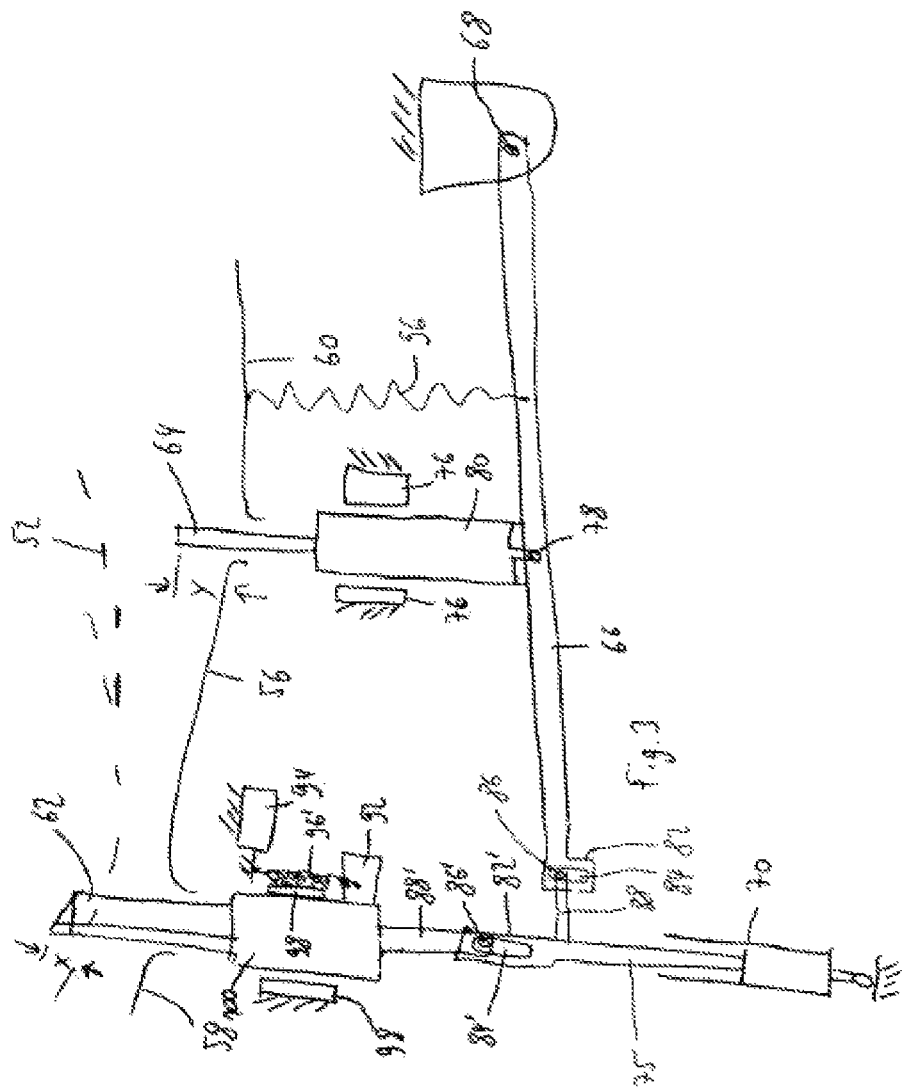

STRAW CHOPPER FOR A COMBINE HARVESTER HAVING COUNTER-BLADES AND A STRAW DAM

FIELD OF THE INVENTION

The invention relates to a straw chopper for a combine harvester, comprising a housing that has an inlet and an outlet, a rotor with suspended chopping blades that is arranged in the housing, adjustably arranged counter-blades that can be moved into the envelope circle of the chopping blades, and a straw dam that can be moved between an active, operating position, in which it cooperates downstream of the counter-blades with the chopping blades in order to comminute the straw, and an inactive, non-operating position; the invention further relates to a combine harvester equipped therewith.

BACKGROUND

Straw choppers are used in agriculture for comminuting crop residues, particularly straw, ejected from a separating device of a combine harvester. The comminuted straw is then distributed by straw guiding plates and/or driven conveying devices across the working width of the harvester head and is intended to be biologically degraded there in order to serve as fertilizer for subsequent crop plants.

Conventional straw choppers comprise a rotor on which suspended chopping blades are mounted. The chopping blades comminute the straw in cooperation with stationary counter-blades, which are usually arranged to be adjustable in position in order to be able to adapt the degree of comminution of the straw to the respective requirements and conditions (See, for example, U.S. Pat. No. 4,612,941 A).

If the straw is to be comminuted even more finely, in order to be biologically degraded more quickly and thoroughly, a so-called straw dam can be brought into an operating position downstream of the counter-blades in which operating position it cooperates with the chopping blades.

This straw dam extends from the housing of the straw chopper at least approximately radially inward. In this operating position, straw accumulates on the upstream side of the friction dam and is further comminuted by the chopping blade when the accumulated straw is conveyed over the straw dam by the chopping blades.

In its operating position, the straw dam is situated just outside the envelope circle of the chopping blades, particularly if it has a straight top edge, or can even penetrate into the envelope circle of the chopping blades if it is provided with notches through which the chopping blades pass. The straw dam can be brought into an inactive non-operating position by being pulled radially outward from of the straw chopper housing, or pivoted about its longitudinal axis and laid flat on the adjacent region of the straw chopper housing.

In the prior art, the counter-blades and the straw dam are adjusted independently of one another. Therefore, two levers or the like must be operated for manual adjustment, and two buttons or switches must be operated from the cab in order to adjust the counter-blades and the straw dam. Therefore a double mechanical effort is necessary for the adjustment and opens the possibility of erroneous operation, because using the straw dam without the counter-blades can hardly lead to the desired effect, but only to wear and tear on the straw dam and to clogging.

The problem addressed by the invention is considered to be the provision of a straw chopper in which the aforementioned disadvantages are not present or are present only in a reduced form.

SUMMARY OF THE INVENTION

A straw chopper for a combine harvester is equipped with a housing, an inlet and an outlet, a rotor with suspended chopping blades that is arranged in the housing, counter-blades arranged to be mechanically adjustable that can be moved into the envelope circle of the chopping blades, and a straw dam that can be moved between an active, operating position, in which it cooperates downstream of the counter-blades with the chopping blades in order to comminute the straw, and an inactive, non-operating position. The mechanism for adjusting the straw dam is coupled to the mechanism for adjusting the counter-blades.

This has the effect that the straw dam is always in a defined relationship with the position of the counter-blades, so that erroneous operation is excluded and the adjusting mechanism can be simplified.

The mechanisms for adjusting the counter-blades and the straw dam can be designed such that first the counter-blades move into the envelope circle of the chopping blades and the straw dam only reaches its operating position when the counter-blades have moved into the envelope circle of the chopping blades up to a defined portion of their travel to a final position, or have moved to the final position.

The mechanisms for adjusting the counter blades and the straw dam can be actuated manually by the operator on site or by an externally powered actuator, so that an operator can adjust them from the cabin by means of a user interface.

The mechanism for adjusting the straw dam can comprise a mounting, which is coupled via a slotted hole connection to the mechanism for adjusting the counter blades, in order to ensure that the counter blades move first into the envelope circle and the straw dam only reaches its operating position subsequently. A second slotted hole connection can ensure that the counter-blades remain in their end position while the straw dam only reaches its operating position after the counter blades have already reached their end position.

In accordance with one aspect of the invention, a straw chopper for a combine harvester, is provided comprising: a housing that has an inlet and an outlet; a rotor with suspended chopping blades that is arranged in the housing; adjustably arranged counter-blades adapted to be moved both into and out of an envelope circle of the chopping blades; and a straw dam adapted to be moved between an active, operating position, in which it cooperates with the chopping blades at a position downstream of the counter-blades in order to comminute the straw, and an inactive, non-operating position, wherein the adjustment of the straw dam is coupled to the adjustment of the counter-blades.

The straw chopper may further comprise a mechanism adapted to adjust both the counter-blades and the straw dam, wherein an initial actuation of the mechanism moves the counter-blades from a non-operational position outside the envelope circle to a first operating position inside the envelope circle, and wherein a further actuation of the mechanism moves the straw dam from the inactive, non-operating position to the active, operating position.

The counter-blades and the straw dam may be operated manually or by an externally operated actuator.

The straw dam may be coupled to a mounting that is coupled via a slotted-hole connection to an actuator or to manually adjustable operating means.

A mechanism for adjusting the counter-blades may comprise a mounting that is coupled via a slotted-hole connection to an actuator or to manually adjustable operating means.

In one configuration, the counter-blades do not extend into the housing when they are in their non-operational position.

The straw dam may not extend into the housing when it is in its inactive, non-operating position.

The first operational position of the counter-blades may be a point of maximum inter-engagement of the counter-blades and the chopping blades.

The straw dam may be in the form of an elongate bar that extends substantially an entire width of the rotor and extends parallel to a rotational axis of the rotor.

In accordance with a second aspect of the invention, a combine harvester may have a straw chopper as described herein.

BRIEF DESCRIPTION OF THE DRAWINGS

Two embodiments of the invention will be explained with reference to figures, wherein the reference numbers are not to be used for a limiting interpretation of the claims.

FIG. 2 shows a side view of a first embodiment of the straw chopper, FIG. 3 shows a longitudinal sectional view of a second embodiment of the straw chopper, and FIG. 4 shows a diagram representing the mode of operation of the mechanisms for adjusting the counter blades and the straw dam.

DETAILED DESCRIPTION OF THE PREFERRED EMBODIMENTS

Figure 1:
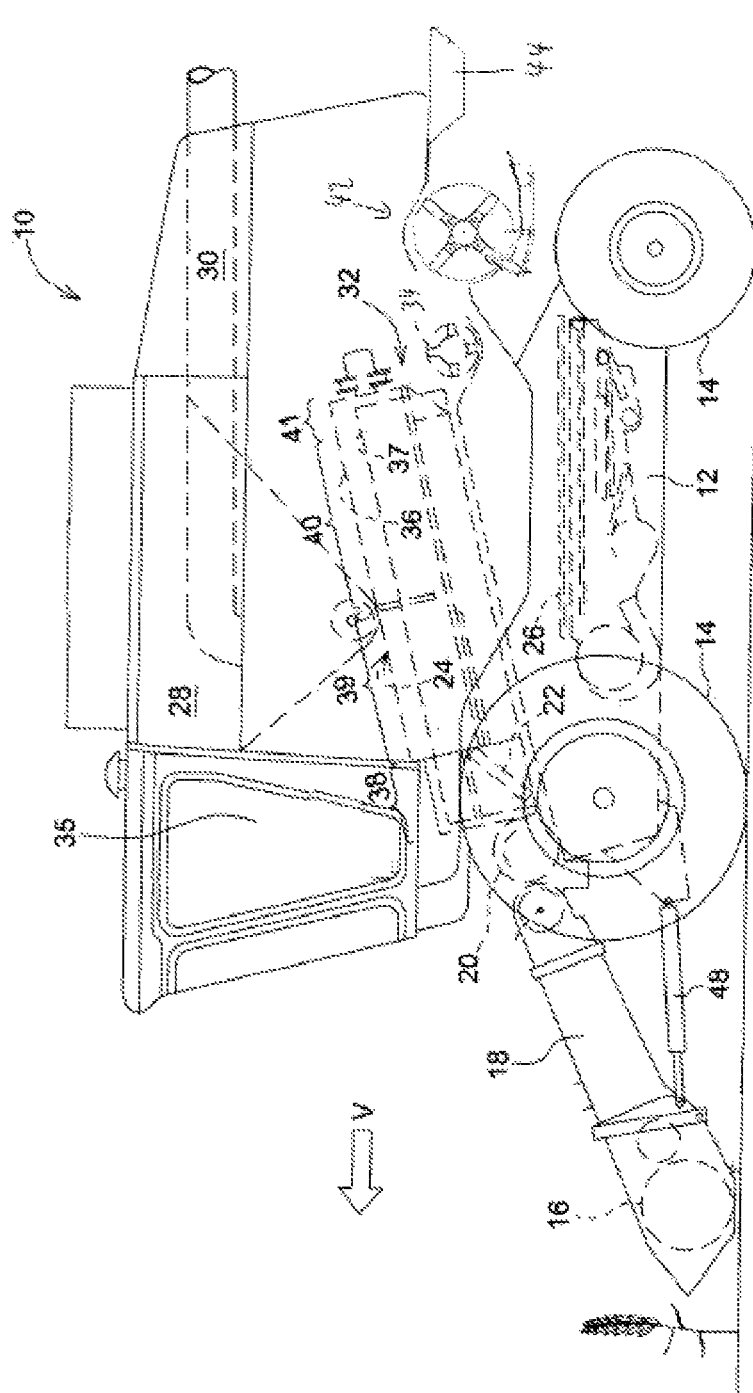
FIG. 1 shows a schematic side view of a combine harvester comprising a straw chopper.

FIG. 1 shows a self-propelled combine harvester 10 that has a support structure 12 that is provided with wheels 14 engaging with the ground. Although a working machine 10 with wheels is illustrated, it could also be furnished with two or four track chains. A harvester head 16 in the form of a cutting mechanism that is adjustable in height by means of a hydraulic cylinder 49 is used for harvesting crop material and guiding it to an inclined conveyor 18. The inclined conveyor 18 contains a conveying device in order to feed the harvest material to a guide drum 20. The guide drum 20 guides the material upward through an inlet transfer section 22 and to a rotatable material processing device 24 designed for threshing and separating. The material processing device 24 shown is arranged axially in the combine harvester but it could also be arranged in different orientations relative to the longitudinal axis of the working machine 10 and be designed, for example, as a tangential threshing mechanism having one or more threshing and/or separating drums with a downstream straw walker or separating rotor(s).

In operation, the material processing device 24 threshes and separates the harvested material. The grain and the chaff fall through gratings at the bottom of the material processing device 24 into a cleaning system 26. The cleaning system 26 removes the chaff and feeds the clean grain via an elevator (not shown) for clean grain. The elevator for clean grain deposits the grain in a grain tank 28. The clean grain in the grain tank 28 can be fed by a discharge screw conveyor 30 to a grain wagon or trailer.

Threshed straw from which the grain has been removed is fed by the material processing device 24 through an outlet 32 to an ejection drum 34. The ejection drum 34 feeds the straw to a straw chopper 42, which chops it and ejects it to the rear, where it is deflected laterally by straw guide plates 44 and distributed over the field across the working width of the harvester head 16. Driven scattering blowers could also be used in place of the straw guide plates 44. The operation of the working machine 10 is controlled from an operator cab 35.

The material processing device 24 comprises a cylindrical rotor housing 36 and a rotatable rotor 37 arranged in the rotor housing 36. The anterior part of the rotor 37 and the rotor housing 36 define a loading section 38. Downstream of the loading section 38 there are a threshing section 39, a separating section 40 and an outlet section 41. The rotor 37 is provided in the loading section 38 with a conical rotor drum, which has spiral loading elements for reaching into the material that the drum obtains from the guide drum 20 and the inlet transfer section 22. The threshing section 39 is located immediately downstream of the loading section 38. In the threshing section 39, the rotor 37 has a cylindrical rotor drum that is provided with a number of threshing elements in order to thresh the grain out of the material obtained in the loading section 38. Downstream of the threshing section 39, the separating section 40 is located, in which the grain still contained in the threshed material is released and falls through a bottom grating in the rotor housing 36 into the cleaning system 26. The separating section 40 transitions into the outlet section 41, in which the grain-free material (straw) is ejected out of the material processing device 24.

FIG. 2 shows the straw chopper 42 in an enlarged representation in relation to FIG. 1. The straw chopper 42 comprises a rotor 46 that is arranged transversely to the forward direction V of the combine harvester 10 (cf. FIG. 1) and horizontally, and can be set into rotation about its axis by suitable drive mechanisms. Brackets, on which chopping knives 48 are mounted so as to swing freely about pendulum axes 50, are distributed across the periphery and length of the rotor 46. A housing 54-60 surrounding the rotor 46 comprises an upper cover 54 and lower covers 58, 56 and 60, which define a front inlet 72 for receiving the straw from the material processing device 24 (and optionally chaff from the cleaning system 26) and a rear outlet 74, from which the chopped material is ejected to the rear against the straw guide plates 44.

The chopping blades 48 cooperate with counter-blades 62, which extend through a gap between a front, lower cover 58 and a center, lower cover 56 and can be advanced by means of an actuator 70 a greater or lesser distance into the envelope circle 52 described by the chopping blades 48. The counter blades 62, or a holder 100 bearing them, are or is mounted movably between guides 98 in an approximately radial direction relative to the rotor 46, and articulated, pivotably about an axis running parallel to the rotational axis of the rotor 46, on the piston rod 75 of an actuator 70 that is articulated to the supporting structure 12 and is itself pivotable about an axis running parallel to the rotational axis of the rotor 46, the actuator being illustrated here as a hydraulic cylinder, which can be replaced by a linear or rotational electrical adjusting drive. The actuator 70 is adjusted from the cab 35 by means of a user interface. If the adjusting direction of the actuator 70 and the displacement direction of the holder 100 coincide, the pivot axes between the holder 100 and the piston rod 75, and between the actuator and the supporting structure 12, can also be replaced by rigid connections.

Furthermore, a pivotable mounting 66 is provided, which is articulated, pivotably about a pivot axis 68 extending parallel to the rotational axis of the rotor 46, to a bracket connected to the rear cover 60 (or the supporting structure 12). A compression spring 96 preloads the mounting 66 downward. A straw dam 64 is attached to the mounting 66. The straw dam 64 extends through a gap between the center, lower cover 56 and a rear lower cover 60 into the interior of the housing of the straw chopper 42. The straw dam 64 is rigidly attached to the mounting 66.

The straw dam 64 is in the form of an elongate bar that extends generally parallel to the axis of rotation of the rotor 46. The straw dam 64 extends in the operating position shown in FIG. 2 from the housing 54-60 of the straw chopper 42 at least approximately radially inward. When the straw dam 64 is extended it causes straw to slow down and accumulate on the upstream side of the straw dam 64 (the left side of the straw dam 64 in the Figures). The straw accumulates on the front face of the straw dam 64 and eventually flows over the top laterally extending edge of the straw dam 64. As the straw and air flows into and over the straw dam 64, they are deflected upward into the envelope circle 52 and thus into the path of chopping blades 48. This accumulation and deflection over the top of the straw dam 64 causes the straw to be reintroduced into the envelope circle 52 where it is comminuted again by the chopping blades 48.

The farther upward (i.e. toward the chopping blades) that the straw dam 64 is extended, the greater the proportion of straw that is slowed and deflected upward into the path of the chopping blades 48, and thus the greater the proportion of straw that is comminuted a second time by the chopping blades 48. Thus, by increasing or decreasing the extension of the straw dam 64 into the housing, the amount of secondary comminuting of the straw can be responsively increased or decreased.

In its operating position as shown in FIG. 2, the straw dam 64 is situated just outside the envelope circle 52 of the chopping blades 48, particularly if it has a straight top edge, or can even penetrate into the envelope circle 52 of the chopping blades 48 if it is provided with notches or slots through which the chopping blades 48 pass. The straw dam 64 can be brought into an inactive non-operational position by being pulled radially outward, completely out of the housing 54-60 of the straw chopper 42, or at least pulled sufficiently far outward that it no longer has any significant effect.

The slotted hole coupling between the mounting 66 and the counter-blades 62 serves this purpose. The counter-blades 62, or the holder 100 thereof, or the actuator 70, are connected to an arm 88, which bears a pin 86 that engages with a slotted hole 84 in a protrusion 82 of the mounting 66. Starting from a non-operational position, in which the counter-blades 62 and the straw dam 64 are outside the housing 54-60, the actuator 70 first moves the counter-blades 62 into the housing 54-60 and into the envelope circle 52 of the chopping knives 48. The compression spring 96 pulls the slotted hole 84 downward, so that the pin 86 rests against the lower end thereof and, during extension of the piston rod 75, shifts more and more upward in the slotted hole 84, while the straw dam 64 is located outside the housing 54-60. Only when the actuator 70 has brought the counter-blades 62 a defined distance x into the envelope circle 52 does the pin 86 come into contact with the upper end of the slotted hole 84 and then moves the mounting 66 with the straw dam 64 into the interior of the housing 54-60, into the active operating position as shown in FIG. 3. The return travel is analogous.

Thus, after the actuator 70 has moved the counter blades 62 beyond a defined distance x, the straw dam 64 moves along with the counter-blades.

In particular, the mounting 66, the slotted hole coupling, the counter-blades 62, and the straw dam 64 are dimensioned and positioned such that, in the retracted position of the actuator 70, the counter-blades 62 do not protrude into the envelope circle 52 of the chopping knives 48 nor does the straw dam 64 protrude into the housing 54-60. Then there is a relatively energy-saving operational mode of the straw chopper 42, which only cuts the straw to low extent, however. If the actuator 70 is then extended further by a distance "d" (cf. FIGS. 2 and 4), first the counter-blades 62 move a distance "x" into the envelope circle 52, but the straw dam 64 does not move into the housing 54-60. This is not the case until the counter-blades 62 have moved into the envelope circle 52 by a certain distance "x", which can amount to 75% of the stroke thereof, as shown in FIG. 4 using the curve 1 for the counter-blade 62 and curve 2 for the straw dam 64. When the actuator 70 is extended, the situation shown in FIG. 2 results, in which both the counter-blades 62 and the straw dam 64 respectively penetrate to the greatest extent possible into the envelope circle 52 or the housing 54-60. Then the straw is intensively cut by the chopping blades 48 in cooperation with the counter-blades 62 and is further comminuted or splintered by means of the straw dam 64, so that it can be quickly degraded biologically.

FIG. 3 shows a second embodiment of the invention, in which elements corresponding to the first embodiment are marked with the same reference numbers.

In the embodiment according to FIG. 3, a holder 80 for the straw dam 64 is mounted movably between guides 76, and articulated, pivotably about an axis parallel to the rotational access of the rotor 46, to the mounting 66 by means of a pivot bearing 78.

As in the first embodiment, the mounting 66 is coupled to the piston rod 75 of the actuator 70 via the slotted hole coupling comprising the slotted hole 84 and the pin 86. An additional slotted hole coupling that has a slotted hole 84' in a protrusion 82', coupled to the piston rod 75, and a pin 86' that is coupled to a holder 100 of the counter-blades 62 via an arm 88' attached to the holder 100, is used for limiting the displacement path of the counter-blades 62 upon reaching their end position while a further movement of the straw dam 64 is still taking place. The holder 100 is mounted movably between guides 98, and is connected to a protrusion 92 that is preloaded in the direction of the rotational axis of the rotor 37 by a tensile spring 96' and cooperates with a stop 94 that is fixed in relation to the housing.

The mode of operation of the embodiment according to FIG. 3 is such that the spring 96 pulls the mounting 100 upward until the pin 86' presses against the upper end of the slotted hole 84'. If the actuator 70 is retracted, the counter-blade 62 is situated outside the envelope circle 52 of the chopping knives 48, and preferably outside the covers 56-60, and the straw dam 64 is outside of the covers 56-60. When the actuator 70 is extended, the pin 86' remains in contact with the slotted hole 84' at the upper end and only the counter-blades 62 initially move into the envelope circle 52, until the protrusion 92 comes to rest at the stop 94 and the counter-blades 62 have reached their most extended possible position. The straw dam 64 initially does not move, as in the first embodiment according to FIG. 2. Only if the actuator 70 is then extended even further does the pin 86 come into contact with the upper end of the slotted hole 84, and the straw dam 64 moves into the interior formed by the covers 56-60. The slotted hole 84' also moves upward relative to the pin 86'. This process corresponds to curves 3 in FIG. 4, where d is again the path of the actuator 70, x is the length by which the counter-blades 62 penetrate into the envelope circle 52, and y is the length by which the straw dam 64 penetrates into the housing 54-60.

The mechanisms shown in FIGS. 2 and 3 for joint adjustment of the counter-blades 62 and the straw dam 64 can be provided at both lateral ends of the straw chopper 42 or only at one end. The actuator 70 can also be eliminated and replaced by means for manual adjustment such as a manually operable lever or a slotted hole that is fixed, relative to the frame, through which a locking screw coupled to the mounting 66 penetrates. The guides 76 of FIG. 3 can also be used in the first embodiment, or the rigid attachment of the straw dam 64 to the mounting 66 according to FIG. 2 can be used in the embodiment of FIG. 3. It would also be possible for the additional slotted hole connection to be eliminated in the embodiment of FIG. 3 and replaced by a spring 96' constructed as a compression spring.

Based on all of this, it can be recognized that the counter-blades 62 and the straw dam 64 are always adjusted jointly, which saves the associated actuating means and simplifies operation.

The invention is defined by the claims. The drawings and description merely illustrate one way the invention may be built and operated.

The invention claimed is:

1. A straw chopper for a combine harvester, comprising:
a housing that has an inlet and an outlet;
a rotor with suspended chopping blades that is arranged in the housing;
counter-blades movable both into and out of an envelope circle of the chopping blades; and
a straw dam movable relative to the housing to vary an extent to which the straw dam projects from the housing towards the envelope circle of the chopping blades, the straw dam being movable between an active, operating position, in which it cooperates with the chopping blades at a position downstream of the counter-blades in order to comminute the straw, and an inactive, non-operating position,
wherein adjustment of the straw dam is coupled to adjustment of the counter-blades.

2. The straw chopper according to claim 1, further comprising a mechanism adapted to adjust both the counter-blades and the straw dam, wherein an initial actuation of the mechanism moves the counter-blades from a non-operational position outside the envelope circle to a first operating position inside the envelope circle, and wherein a further actuation of the mechanism moves the straw dam from the inactive, non-operating position to the active, operating position.

3. The straw chopper according to claim 1, wherein the counter-blades and the straw dam are operably connected to a single externally operated actuator.

4. The straw chopper according to claim 1, wherein the straw dam is coupled to a mounting that is coupled via a slotted-hole connection to an actuator.

5. The straw chopper according to claim 1, wherein a mechanism for adjusting the counter-blades comprises a mounting that is coupled via a slotted-hole connection to an actuator.

6. The straw chopper according to claim 2, wherein the counter-blades through that do not extend into the housing when they are in their non-operational position.

7. The straw chopper according to claim 2, wherein the straw dam does not extend into the housing when it is in its inactive, non-operating position.

8. The straw chopper according to claim 2, wherein the first operational position of the counter-blades is a point of maximum inter-engagement of the counter-blades and the chopping blades.

9. The straw chopper according to claim 1, wherein the straw dam is in the form of an elongate bar that extends substantially an entire width of the rotor and extends parallel to a rotational axis of the rotor.

10. A combine harvester that has a straw chopper according to claim 1.

11. The straw chopper according to claim 1, wherein the straw dam is movable through a concave portion of the housing facing the envelope circle of the chopping blades.

12. The straw chopper according to claim 1, wherein the straw dam is operably coupled to the counter blades such that the straw dam automatically moves in response to movement of the counter blades.

13. The straw chopper according to claim 12, wherein the straw dam is operably coupled to the counter blades such that the straw dam begins to automatically move in response to movement of the counter blades following a lag time during which the counter blades have already moved.

14. The straw chopper according to claim 12, wherein the straw dam is operably coupled to the counter blades such that the counter blades intersect the envelope circle prior to intersection of the envelope circle by the straw dam.

15. The straw chopper according to claim 12, wherein the straw dam is operably coupled to the counter blades such that the counter blades intersect the envelope circle prior to the straw dam projecting beyond the housing towards the envelope circle.

16. The straw chopper according to claim 12, wherein the straw dam is operably coupled to the counter blades such that the straw dam continues to move following the counter blades reaching an end of travel state.

17. The straw chopper according to claim 1 further comprising at least one force transmitting member operably coupling the counter blades to the straw dam such that movement of the counter blades automatically results in movement of the straw dam.

18. A straw chopper for a combine harvester, comprising:
a housing that has an inlet and an outlet;
a rotor with suspended chopping blades that is arranged in the housing;
adjustably arranged counter-blades adapted to be moved both into and out of an envelope circle of the chopping blades; and
a straw dam adapted to be moved between an active, operating position, in which it cooperates with the chopping blades at a position downstream of the counter-blades in order to comminute the straw, and an inactive, non-operating position,
wherein adjustment of the straw dam is coupled to adjustment of the counter-blades; and
a mechanism adapted to adjust both the counter-blades and the straw dam, wherein an initial actuation of the mechanism moves the counter-blades from a non-operational position outside the envelope circle to a first operating position inside the envelope circle, and wherein a further actuation of the mechanism moves the straw dam from the inactive, non-operating position to the active, operating position.

19. The straw chopper according to claim 18, wherein the counter-blades through that do not extend into the housing when they are in their non-operational position.

20. The straw chopper according to claim 18, wherein the straw dam does not extend into the housing when it is in its inactive, non-operating position.

\* \* \* \* \*